United States Patent [19]

Hayashi et al.

[11] Patent Number: 4,759,060

[45] Date of Patent: Jul. 19, 1988

[54] DECODER FOR A PAY TELEVISION SYSTEM

[75] Inventors: Toshihide Hayashi; Masayoshi Kanno, both of Tokyo, Japan

[73] Assignee: Sony Corporation, Tokyo, Japan

[21] Appl. No.: 793,554

[22] Filed: Oct. 31, 1985

[30] Foreign Application Priority Data

Oct. 31, 1984 [JP] Japan ................................ 59-229348
May 21, 1985 [JP] Japan ................................ 60-110001

[51] Int. Cl.⁴ ...................... H04N 7/167; H04N 7/00
[52] U.S. Cl. ........................................ 380/10; 235/378; 358/84; 379/131; 455/2
[58] Field of Search ............... 358/114, 115, 117, 122, 358/123, 84; 455/2; 380/16, 10; 235/378; 379/131

[56] References Cited

U.S. PATENT DOCUMENTS 3,508,005  4/1970  Hamburger ........................... 358/84
3,760,160  9/1973  Gieringer et al. ................... 235/378
4,417,101 11/1983  Serres et al. ........................ 379/131
4,484,217 11/1984  Block et al. ......................... 358/122

*Primary Examiner*—Stephen C. Buczinski
*Attorney, Agent, or Firm*—Hill, Van Santen, Steadman & Simpson

[57] ABSTRACT

A decoder for a pay television system incorporates a receiver for receiving scrambled programming and control data transmitted from a remote location, with the control data including data corresponding to the program fee and the program status, and a manual switch for selectively descrambling the program data when the program status is a pay-per-view program. The decoder has a storage unit for storing a credit value, transmitted from the remote location, and the decoder has timer apparatus for measuring the time during which a pay-per-view program is being received and for subtracting a program fee periodically from the value stored in the storage unit, during the time of reception of the selected program, provided the switch is operated to descramble the program.

2 Claims, 6 Drawing Sheets

DECODER FOR A PAY TELEVISION SYSTEM

BACKGROUND OF THE INVENTION

1. Field of the Invention

The present invention relates to a decoder for a pay television system and, more particularly, to a decoder suitable for a pay television system using CATV broadcasting or DBS broadcasting.

2. Description of the Prior Art

Broadcasting systems include CATV (cable television) systems and DBS (direct-broadcasting satellite) systems. These systems frequently are used for pay television systems using an appropriate converter.

In a pay television system of this type, a conventional decoder for decoding a program of a desired channel has mainly two status modes: a free mode and a pay mode. The free mode allows free reception of a TV program, and the pay mode represents a status mode in which a subscriber is charged for reception of a TV program.

More particularly, the pay mode is further classified into a flat fee mode, a tier level pay mode and a pay-per-view mode. In the tier level pay mode, a tier level representing the rank of programs to be received by the decoder is predetermined. A user subscribes to a desired tier level and pays fees to a broadcast station corresponding to the subscribed tier level. In the pay-per-view mode, the user reserves desired programs and pays the program fee only for the reserved programs to a broadcast station.

In the conventional pay-per-view mode, user procedures are cumbersome. When the user wishes to watch a pay program in the pay-per-view mode according to a first conventional procedure, the broadcast station mails a program schedule to each user. The user telephones the center by a predetermined date before a desired program is to be broadcast (i.e., a week or a day beforehand) so as to reserve the desired program. At this time, the user pays the fee for the program. When the desired program is on the air, the center sends a reservation confirmation signal (hereinafter referred to as an ID signal) to a user who has reserved the corresponding program. When a user's receiver or a decoder in the receiver receives the ID signal, a scrambled program signal is descrambled by the decoder, so that the user can watch the desired program.

In the pay-per-view system described above, (A) the user must telephone the center to reserve the desired program, which is cumbersome and may be inconvenient, (B) each program has a reservation due date, so that the user cannot reserve the desired program when the reservation due date has passed, (C) fees cannot be refunded even if the user does not watch the reserved program, and (D) an idle time is required to send the ID signal to all reserved users at the beginning of every reserved program.

According to a second conventional technique which represents an improvement on the first conventional techique, a pay-per-view status signal is sent from the center to each user. When the user wishes to watch a program represented by the pay-per-view station signal, he depresses a pay-per-view switch located on his tuner. The scrambled program is then descrambled, and the user can watch the program. When the user actually watches the program, charge data transmitted with the subscribed program is stored in an account memory of the decoder. The center periodically checks the contents of the account memory of each decoder, using a telephone line, and collects fees or bills the applicable charge.

The second conventional technique effectively solves the drawbacks of the first conventional technique. However, since the center must periodically check the account memories of all users, the check system is complicated. Furthermore, since fee collection is performed by use of a telephone line, an auto-dial unit and a modem (modulator/demodulator) are required, so that the required user unit and center unit are complex and expensive.

SUMMARY OF THE INVENTION

It is an object of the present invention to provide a decoder for a pay television system wherein a user can conveniently use the pay television system with a simplified payment system.

In order to achieve the above object of the present invention, there is provided a decoder for a pay television system, comprising: an advance account memory for storing deposit data sent from a broadcast center; means for subtracting program fees from contents of the advance account memory for every reception of a pay program; and means for manifesting a warning display when the contents of the advance account memory equals less than a predetermined value.

Furthermore, according to the present invention, the pay-per-view mode is classified into two sub-modes to prevent unreasonable payment. A first sub-mode constitutes a time pay-per-view mode for determining the charge per unit of time and the second sub-mode constitutes a program pay-per-view mode for determining a charge per program. The tuner decodes a program status code signal sent from the broadcast center and selects either the time pay-per-view sub-mode or the program pay-per-view sub-mode.

The broadcast center can determine which sub-mode applies to programs of different sorts, without interfering with the user's ability to view programs. For instance, the program pay-per-view mode may be employed for a special sports program such as a boxing match program while other programming employs the other sub-mode. In this way a reasonable charge for any program can be made.

BRIEF DESCRIPTION OF THE DRAWINGS

Reference will now be made to the accompanying drawings in which.

DETAILED DESCRIPTION OF THE PREFERRED EMBODIMENT

Figure 1:
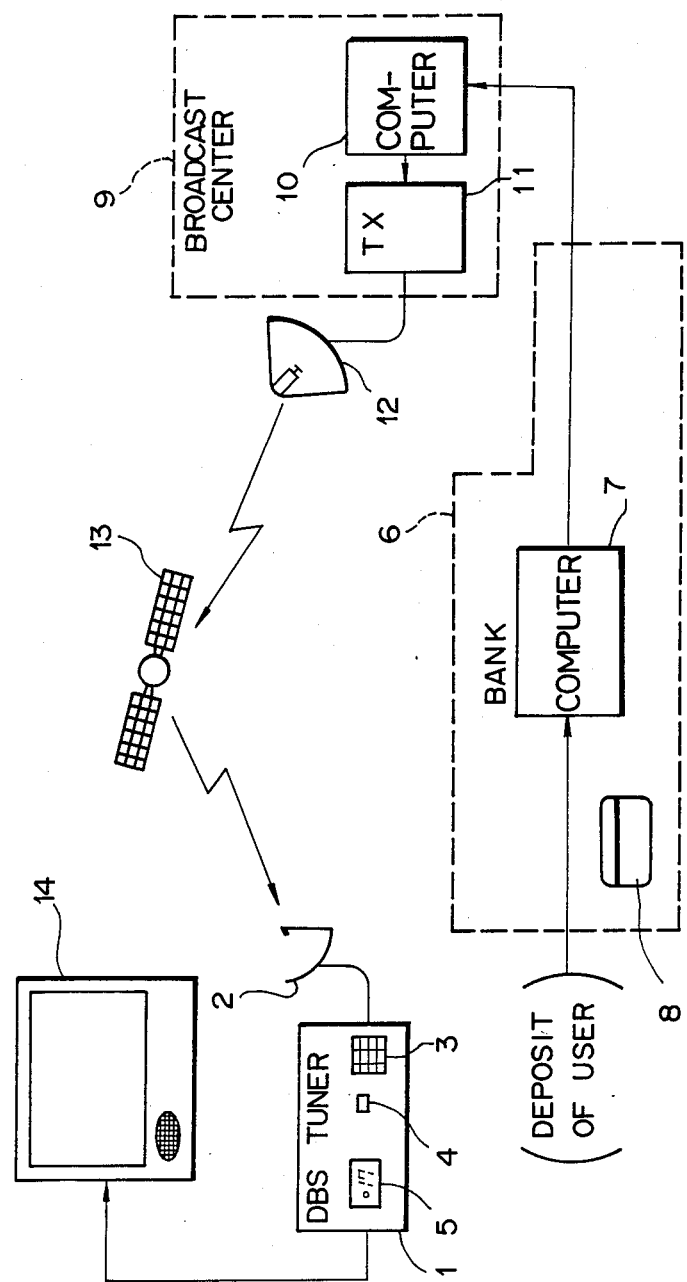
FIG. 1 is a schematic diagram of a pay-per-view system applied to a direct broadcast system utilizing a broadcast satellite.

FIG. 1 is a schematic diagram of a pay-per-view system applied to a direct broadcast system utilizing a broadcast satellite. A broadcast wave from a broadcast satellite 13 is directly received by a receiving parabolic antenna 2 and supplied to a DBS (Direct Broadcast System) tuner unit 1. Audio and video signals reproduced by the DBS tuner 1 are supplied to a monitor 14. An unscrambled broadcast signal is reproduced by a decoder in the tuner 1 in the free mode. However, in the pay mode or the pay-per-view mode, a scrambled broadcast signal is descrambled and reproduced on the TV screen.

When the pay-per-view mode is utilized by the user, the user deposits funds using a cash card 8 or the like, advance money from an account within a bank 6 to a broadcast center 9. The cash card 8 is conveniently used with an automatic teller machine or ATM (not shown). The deposit data is transmitted from a computer system 7 of the bank 6 to a computer system 10 of the broadcast center 9. The desired program is transmitted from the center 9 to the user through a satellite broadcast link. The deposit data is inserted in the data coded in a PCM data signal transmitted during a vertical blanking period of the video signal. The deposit data is transmitted from a transmitter 11 to the parabolic antenna 2 of each user through a broadcast parabolic antenna 12 by way of the broadcast satellite 13.

The tuner 1 of each user has an advance money memory, and the deposit data is stored therein. The content of the storage can be displayed anytime on a display 5.

Figure 2:
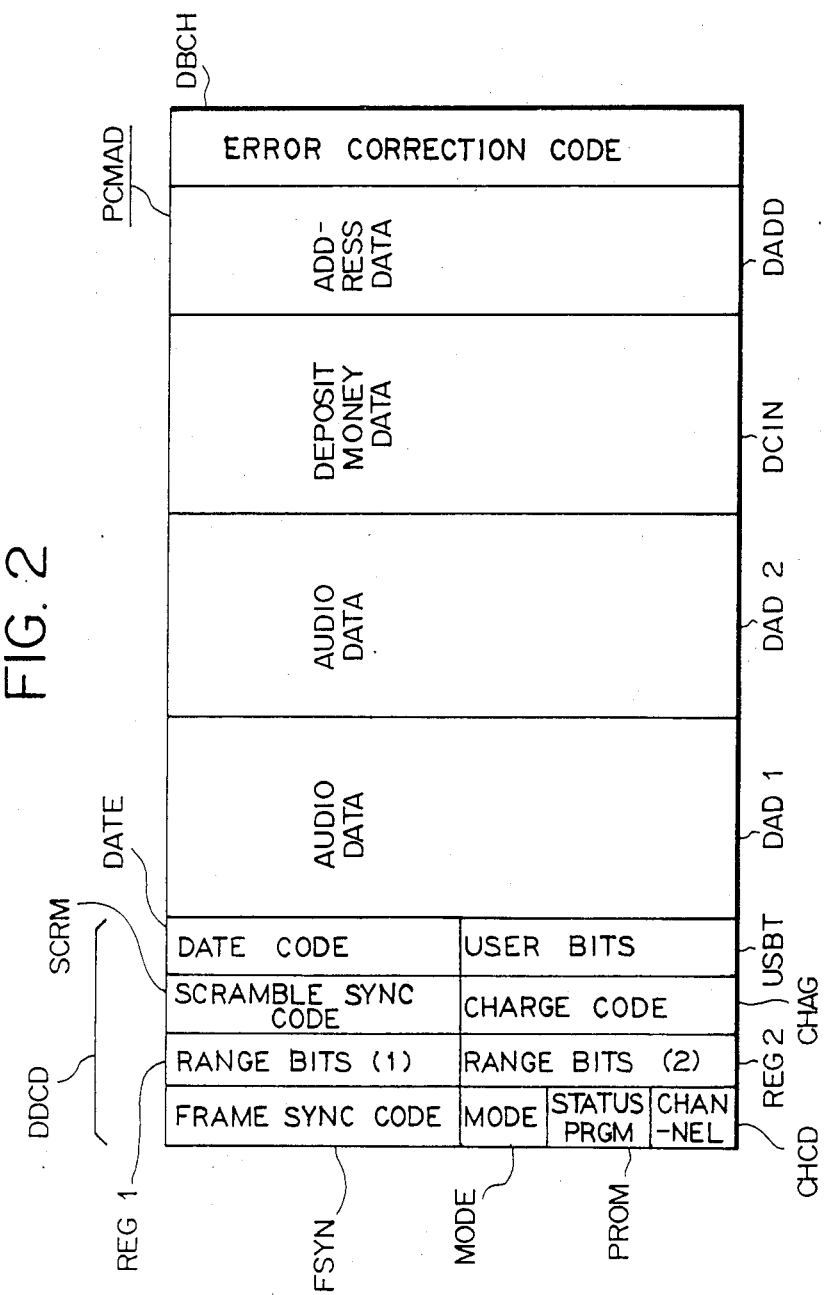
FIG. 2 is an illustration of a data format of a PCM data signal used in the direct broadcast system.

The broadcast center 9 transmits a television signal having a PCM data signal PCMAD with the format shown in FIG. 2 during a vertical blanking period of the video signal. The PCM audio signal PCMAD incorporates a plurality of data fields for data of different types. Two fields correspond to two (alternately used) channels of audio data DAD1 and DAD2. Also included are a field for the deposit money data DCIN (representing the amount of the deposited fees) and a field for address data DADD (including the user ID code). A data code field DDCD is added to the above data string, and an error check code field DBCH is also added to the end of the data string.

The data code field DDCD contains a frame sync code FSYN as the initial data thereof. The following data consist of the mode data word MODE, a program status code word PROM, a channel code CHCD representing a broadcast channel number, first and second range bits REG1 and REG2 used to expand the compressed audio data, a scramble sync code SCRM used for descrambling the signal, a charge code CHAG representing the program fees, a data code DATE, and user bits USBT.

THe program status code PROM comprises a 4-bit code signal representing the pay mode assigned to the current broadcast program. For example, in one embodiment the program status code PROM is set to be "0000" in the free mode and "0001" in the pay mode.

The pay-per-view mode is further classified into a time pay-per-view mode represented by a code "0101" and a program pay-per-view mode represented by a code "0110".

The free and pay mode are, respectively, a mode for allowing free reception of programs and a mode for subscription programs on a monthly basis in the same manner as in the conventional system. The time pay-per-view sub-mode is set to charge for the length of listening time, and the program pay-per-view sub-mode is set to charge predetermined fees for the program regardless of reception time.

The broadcast center 9 transmits with each program the program status code PROM added to the data code DDCD. A proper pay mode is predetermined in accordance with the contents of the program by the broadcast station, so that the appropriate program status code PROM is added to the data code DDCD, and the resultant broadcast signal is transmitted to the user. Thus, fees can be charged in accordance with charging modes suitable for the respective programs.

In the DBS tuner unit 1 which receives the broadcast signal, the PCM data signal PCMAD is supplied to a PCM decoder 21 (FIG. 3), located within the DBS tuner unit 1 (FIG. 1). The PCM decoder 21 decodes the PCM audio signal PCMAD to extract the first and second channel audio data DAD1 and DAD2 (FIG. 2) which are supplied to an audio processor 22. The other data DATA are supplied to a central processing unit (CPU) 23 which is preferably a microcomputer. A video signal VDIN (which may be scrambled) in the broadcast signal is supplied to the input of a video processor 24, which is adapted to unscramble the video signal if necessary.

Figure 4:
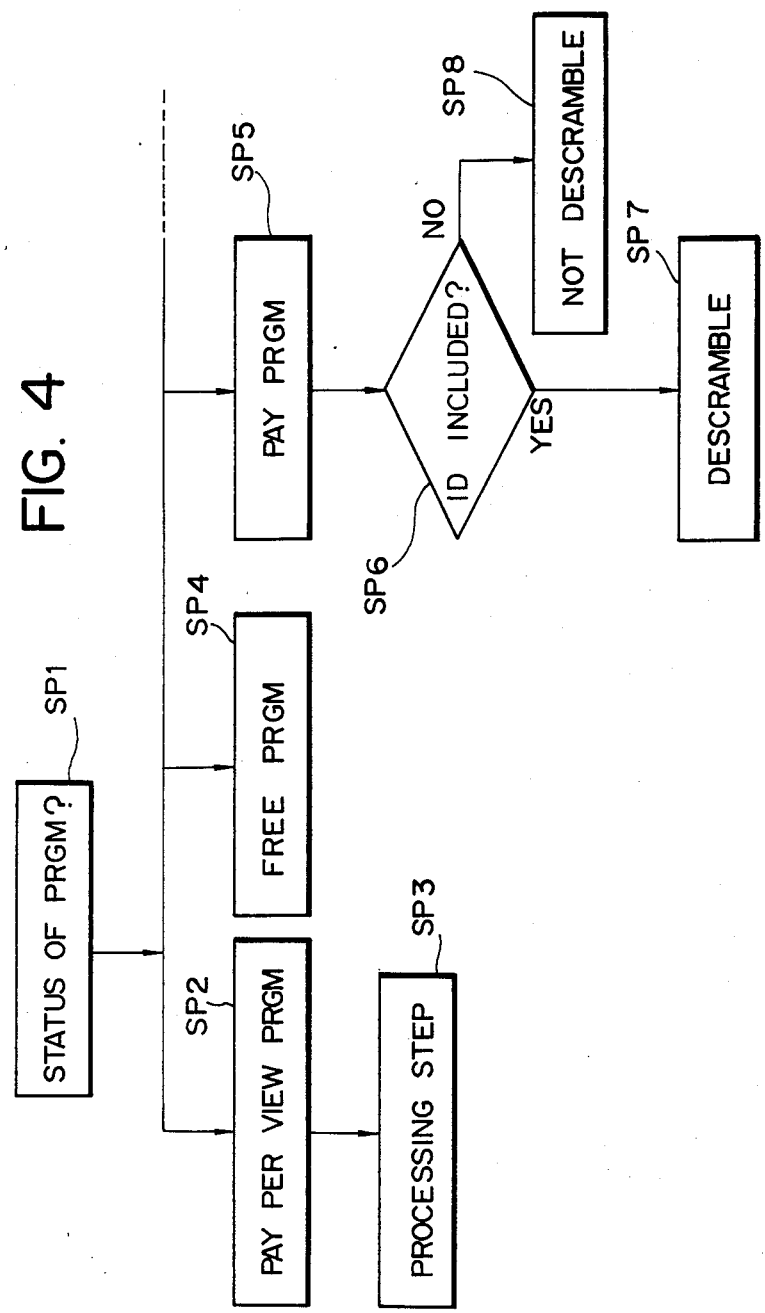
FIG. 4 is a flow chart illustrating the operation mode of the tuner shown in FIG. 1.

As shown in FIG. 4, the step SP1 inspects the code word PROM and controls subsequent operation accordingly. When the program status code PROM represents the time pay-per-view mode or the program pay-per-view mode (step SP1) a pay-per-view program SP2 runs under the control of the CPU 23 to perform a processing step SP3.

However, when the program status code PROM represents the free mode, a free mode program SP4 is executed. In this case, the CPU 23 causes the audio processor 22 to decode the audio data DAD1 and DAD2 and the video processor 24 to decode the video input signal VDIN.

When the program status code PROM represents the pay mode, a pay program SP5 is executed under control of the CPU 23. The CPU 23 determines in step SP6 whether or not the user ID signal included in the data DATA is as same as a unique user ID assigned to the tuner unit 1. If YES in step SP6, the CPU 23 supplies the scramble sync code SCRM to the audio and video processors 22 and 24 so as to cause them to perform descrambling of the audio data DAD1 and DAD2 in step SP7. Therefore, the audio and video signals are both reproduced. However, if the result is NO in step SP6, the CPU 23 does not supply the scramble sync code SCRM to the audio and video processors 22 and 24 so as not to cause them to perform descrambling of the audio and data DAD1 and DAD2.

The audio signal reproduced by the audio processor 22 is supplied to a digital-to-analog D/A converter 25. The D/A converter 25 generates an audio output signal AUDIO. The video signal reproduced by the video processor 24 is supplied to a buffer amplifier 26. A video output signal VIDEO is generated as the sum output of an adder 27.

Figure 5:
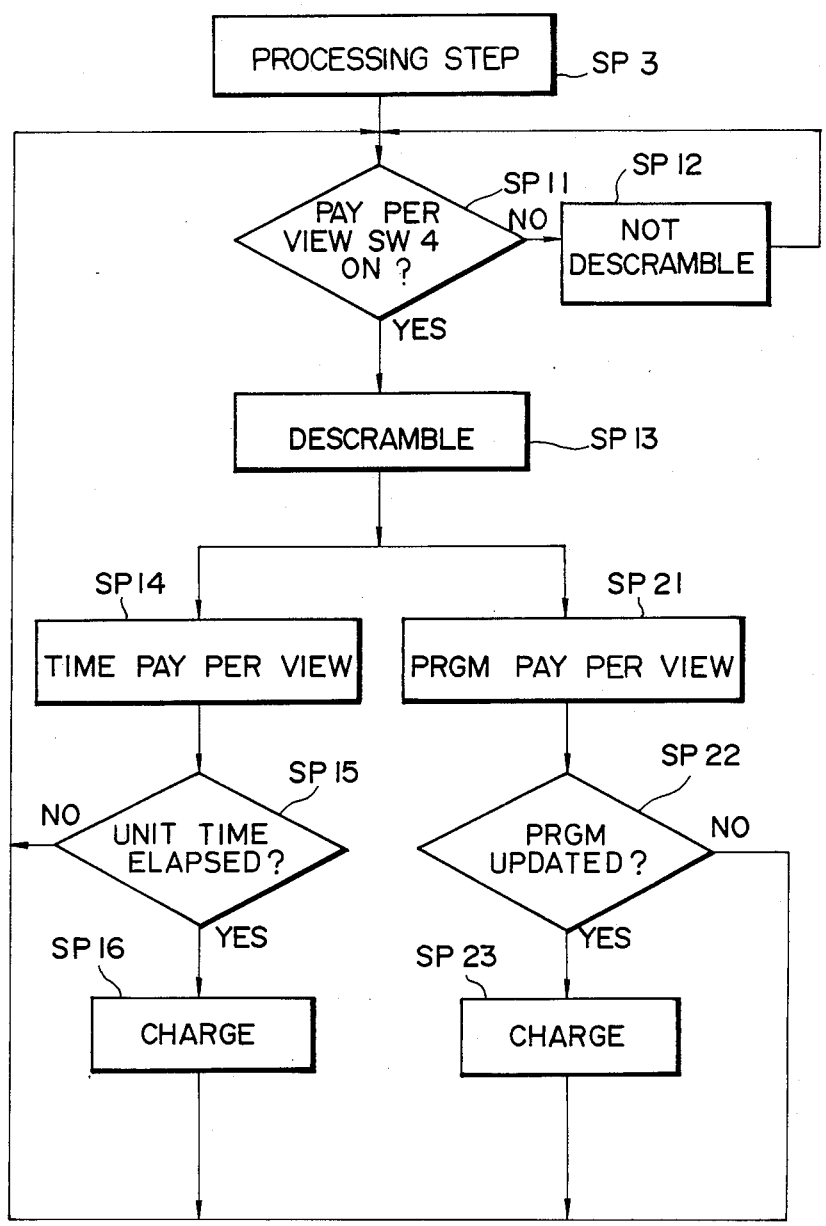
FIG. 5 is a flow chart illustrating the pay-per-view mode of the tuner.

In the pay-per-view mode, the CPU 23 performs the processing step SP3, as shown in FIG. 5. When the processing step SP3 is started, the CPU 23 checks in step SP11 whether or not a pay-per-view switch 4 is turned on.

As shown in FIG. 1, the pay-per-view switch 4 is mounted on the operation panel of the tuner unit 1. After the user enters a desired channel with a ten-key pad 3, he depresses the pay-per-view switch 4 in case when the program is a pay-per-vew program, which sets the tuner 1 in the pay-per-view mode. The reception channel number is displayed on the display 5. The above sequential operations are performed under the control of the CPU 23.

If the result of step SP11 is NO (FIG. 5), the CPU 23 determines that the user has not set the tuner 1 in the pay-per-view mode. Control then advances to step SP12, and no descrambling is performed. Thereafter, the flow returns repeatedly to step SP11. The CPU 23 thus waits until the user turns on the pay-per-view switch 4.

When the pay-per-view switch 4 is turned on by the user, the result of the decision step SP11 is YES. The CPU 23 then supplies the scramble sync code SCRM to the audio and video processors 22 and 24 for descrambling. The CPU 23 thus controls the generation of both the audio and video output signals AUDIO and VIDEO.

When the content of the program status code PROM represents the time pay-per-view mode, the CPU 23 fetches this data in step SP14, and the flow advances to step SP15.

The CPU 23 checks in step SP15 the length of viewing time in the time pay-per-view mode. More specifically, the CPU 23 checks whether or not a unit time has been counted by a timer incorporated in the CPU 23. If the result is NO in step SP15, the control flow returns to step SP11. The CPU 23 waits until counting of the unit time by the timer is completed by a loop of the steps SP11, SP13, SP14, SP15 and SP11.

Figure 3:
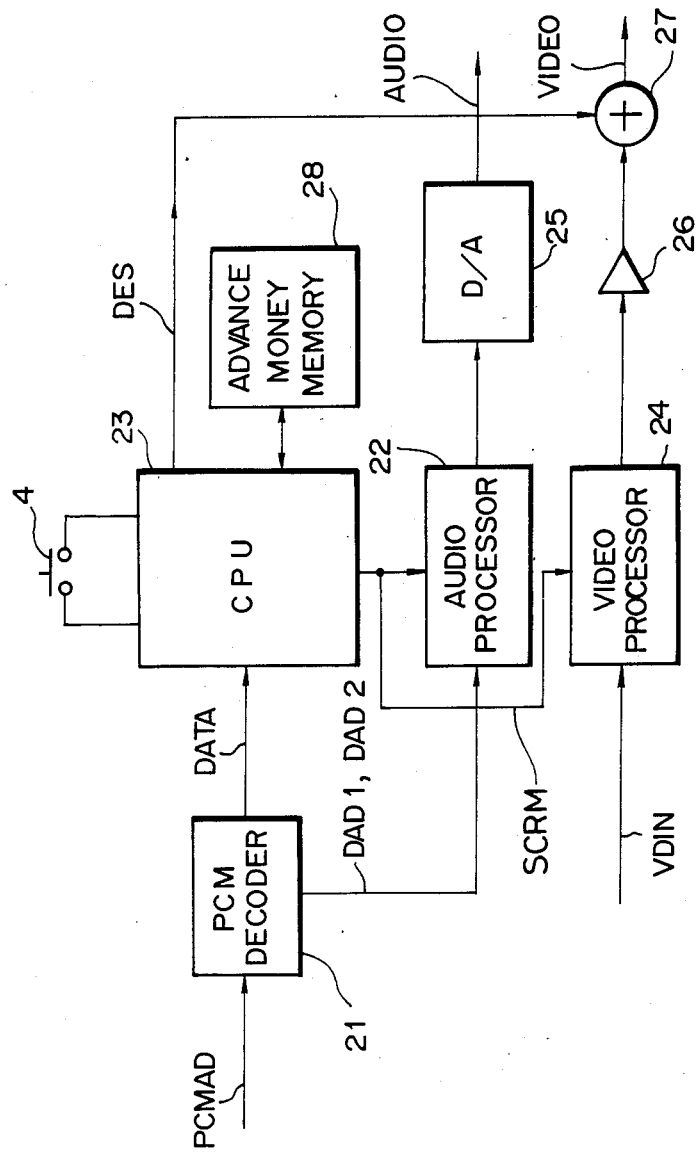
FIG. 3 is a block diagram of the tuner unit shown in FIG. 1.

When the unit time has elapsed, the result of step SP15 is YES. The control flow then advances to the charge step SP16, in which one unit time fee is subtracted from the contents of the memory 28 (FIG. 3). This may be a fixed quantity, or a quantity designated by the CHAG field of the PCM data. The control flow returns to step SP11 again to reset the timer. The CPU 23 waits for the predetermined unit time to elapse by the loop of steps SP11, SP13, SP14, SP15 and SP11.

In the same manner as described above, the CPU 23 sends out the audio and video output signals AUDIO and VIDEO which are descrambled and reproduced by the audio and video processors 22 and 24 while the time pay-per-view mode program is being received by the user. A fee corresponding to the viewing time of the program is subtracted from the contents of the advance money memory 28 in the step SP16.

When the user wishes to stop receiving the program in the time pay-per-view mode, he merely turns off the pay-per-view switch 4. In this case, the decision step SP11 is determined by the CPU 23 to be NO, and the CPU 23 then causes the audio and video processors 22 and 24 to disable descrambling by the loops of steps SP11-SP12-SP11 . . . , etc.

When the user wishes to watch programs in the program pay-per-view mode, the user simply turns on the time pay-per-view switch 4 of the tuner 1 in the same manner as in the time pay-view mode. In this case, after the decision step SP11 is determined by the CPU 23 to be YES, the CPU 23 controls the audio and video processors 22 and 24 to perform descrambling in step SP13.

In this case, the program status code PROM included in the data DATA represents the program pay-per-view mode detected by the CPU 23 in step SP21. The control flow advances to the decision step SP22. The CPU 23 determines in step SP22 whether the current program being received is the same as the program being received when the unit SP22 last had control or whether the program being received has been changed. If the result is NO in step SP22, the CPU 23 determines that the same program is being received. Then the control flow returns to step SP11. The user can continuously watch the program in the program pay-per-view mode by a loop of the steps SP11, SP13, SP21, SP22 and SP11.

When the user wishes to change the content of the current program being received, the decision step SP22 is determined by the CPU 23 to be YES. Then a charge is subtracted from the contents of the advance money memory 28 at the step SP23, and the flow returns to step SP11.

Once the program is changed, the mode is set to continue the changed program. The CPU 23 monitors this program by the loop of steps SP11, SP13, SP21, SP22 and SP11.

Every time one program is completed or finished, the CPU 23 performs charge processing, so that the user is charged per program, irrespective of the elapsed time.

When the user operates the pay-per-view switch 4, the mode of the tuner 1 is set to be either the time pay-per-view mode or the program pay-per-view mode. The CPU 23 supplies to an input of the adder 27 (FIG. 3) a display signal DES representing that the current program is set in the time or program pay-per-view mode. For example, numerical value "1" representing the time pay-per-view mode or numerical value "2" representing the program pay-per-view mode is displayed on the screen of the monitor 14. The user can easily visually determine the charging mode being used for the current program.

Figure 6:
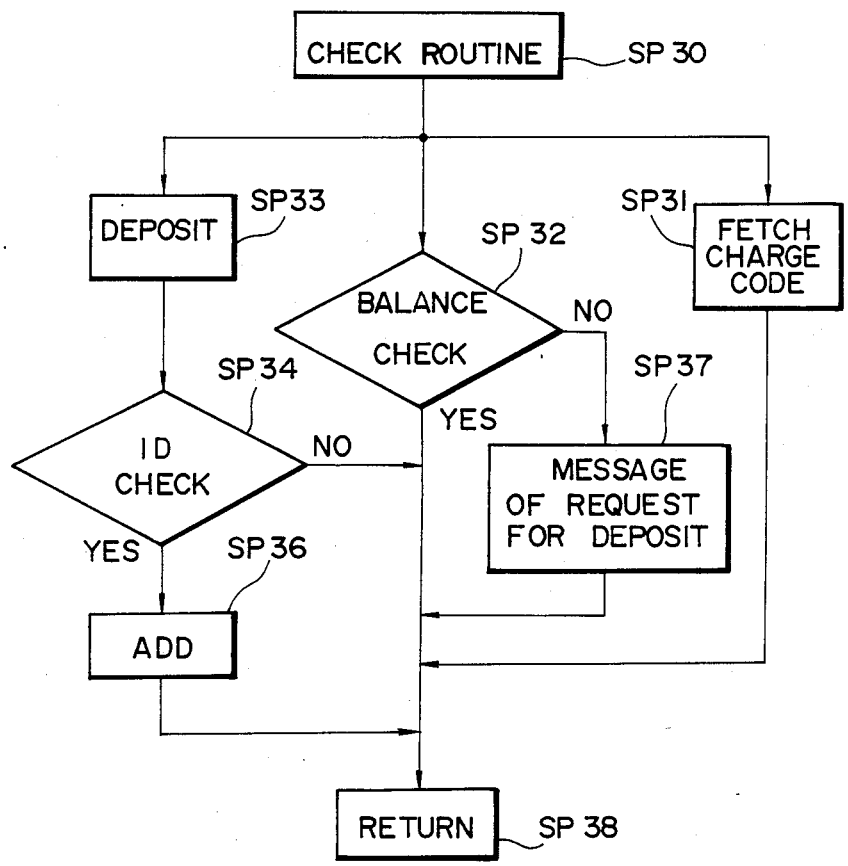
FIG. 6 is a flow chart illustrating a control program continuously executed by the CPU of the tuner.

FIG. 6 illustrates a flow chart of operations continuously checked by the CPU 23. Normally, control stays in one of the loops illustrated in FIG. 5. These loops are represented in FIG. 6 by the Fetch Charge Code step SP31, which passes control through the Return step SP38. The Return step SP38 returns control to step SP30 which normally passes control to the Fetch Charge Code step SP31, to define the loop of FIG. 5 which is active (for the appropriate sub-mode). Periodically, the check routine step SP30 sends control to two other paths illustrated in FIG. 5. Preferably this is accomplished by a signal from a timer of the CPU 23 which interrupts the normal control loop, to check the balance data maintained in the memory unit 28 at periodic intervals, or to update the data stored in the memory unit 28 in response to detection of data within the DCIN field of PCMAD (FIG. 2). In the loops represented by the step SP31, the charge code data CHAG superposed on the program by PCMAD is detected by the CPU 23, and, as previously described, when the program or channel is changed, the step SP31 is executed.

The step SP32 receives control periodically by a timer interrupt. Alternatively, execution of a charge step SP16 or SP23 (FIG. 5) may include the setting of a flag which causes the step SP30 to pass control to the step SP32. In step SP32, the CPU 23 compares the balance of the advance money memory 28 with the charge code CHAG fetched by step SP31. When the CPU 23 determines that the balance of the advance money memory 28 is smaller than the data represented by the charge code CHAG, the CPU 23 causes the monitor 14 to display a message representing a request for deposit in step SP37. In this case, the DPU inhibits the SCRM signal, so that the program cannot be watched. The deposit data is checked in step SP33. The step SP30 passes control to the step SP33 periodically, by a timer interrupt, so that the control data PCMAD may be checked for deposit information. Alternatively, the step SP30 may check each incoming control word PCMAD for deposit data and branch to the deposit routine SP33 whenever data is detected within the DCIN field. When deposit money data DCIN is detected as present in step SP33 (FIG. 6), the CPU 23 checks the ID code included in the address data DADD. In this case, if the result is YES in step SP34, the deposit money data DCIN is added to the content of the advance money memory 28 in step 36. When all the routines are completed in FIG. 6, the flow returns from the step SP38. Preferably, the advance money memory 38 comprises a nonvolatile memory device such as an MNOS semiconductor RAM.

With the above arrangement, the pay-per-view mode for designating a pay program is classified into time and program pay-per-view sub-modes. Charging is determined in units of time or programs. Therefore, a reasonable charging system suitable for the purposes of users can be established.

A desired program need not be reserved by telephone, and the user can conveniently enjoy the direct broadcast satellite system. If the user does not watch a reserved program no charge is made. Furthermore, when the pay-per-view switch 4 is depressed, the user can watch any program at any time, provided the sum stored in the memory 28 is enough.

Since the user is not charged through a telephone line (bidirectional communication system), the configuration of the user's receiver and the broadcast center system can be simplified and made less expensive. The user simply receives a message via SP37 representing a request for a deposit when the value of the advance account memory is less than the predetermined value which is needed for viewing a particular program. The user pays a fee in accordance with the message, or else has it automatically deducted from the memory 28, so that a simple efficient system can be provided. In the pay-per-view system of this embodiment, the transmission line from each user to the center comprises a link through a bank or the like. Such a link may be located at the user's home, or a public link may be used such as the link of a bank's automatic teller machine or ATM. Program fee data, deposit amount data, and the like are sent from the center to the user through a transmission line using the regular broadcast channel as shown in FIG. 1. Shortage of a deposit amount is automatically displayed by the user's monitor. Therefore, a conversational two-way communication between the user and the center is provided, though only a one-way line terminating at the user's home is actually used.

According to the present invention, the center may, but need not, send the ID signal to all users when payment data is obtained. Many control words relative to payment data can be sent to users within a limited time, and additional information such as a text or message can be sent, if desired.

The above embodiment exemplifies a DBS broadcast system. However, the present invention can be applied to other pay broadcast systems such as a cable television (CATV) system. The present invention can also be applied to an audio pay broadcast system.

Alternatively, in the above embodiment, the fee corresponding to the actual viewing time detected by the timer incorporated in the CPU 23 can be subtracted from the contents of the advance account memory periodically, by means of a timer interrupt procedure, which is enabled during the course of a pay mode.

According to the present invention, charging is determined in units of time and programs, so that a reasonable charging system can be established to suit for user's interests.

What we claim are:

1. A decoder control circuit for a pay television system comprising:
    means for descrambling a selected video program transmitted from a center at a remote location;
    means for receiving and decoding control data transmitted from said center, said control data including at least program fee data and program status data;
    advance money memory for storing money data transmitted from said center; and
    control means for subtracting a program fee from the money data stored in said advance money memory upon reception of said selected program;
    said control means including a manual switch for selectably allowing descrambling of said program when said program is a pay-per-view program, as represented by pay-per-view status data in said control data; and
    said control means including timer means adapted to measure the time during which said program is received, and for controlling said subtraction based on the measure of reception time.

2. The decoder control circuit as claimed in claim 1, including means for activating said timer means when said manual switch is turned on, and for deactivating said scrambling when said manual switch is turned off during the period of reception of a time pay-per-view program.

* * * * *